US008066566B2

(12) United States Patent
Morrow et al.

(10) Patent No.: US 8,066,566 B2
(45) **Date of Patent: *Nov. 29, 2011**

(54) RECONFIGURABLE GAMING MACHINE

(75) Inventors: James Morrow, Sparks, NV (US); Robert Miodunski, Henderson, NV (US)

(73) Assignee: Bally Gaming International, Inc., Las Vegas, NV (US)

( * ) Notice: Subject to any disclaimer, the term of this patent is extended or adjusted under 35 U.S.C. 154(b) by 877 days.

This patent is subject to a terminal disclaimer.

(21) Appl. No.: 12/029,405

(22) Filed: Feb. 11, 2008

(65) Prior Publication Data

US 2008/0146326 A1 Jun. 19, 2008

Related U.S. Application Data

(63) Continuation of application No. 09/967,283, filed on Sep. 28, 2001, now Pat. No. 7,338,372.

(51) Int. Cl.

*A63F 9/24* (2006.01)
*A63F 13/00* (2006.01)
*G06F 17/00* (2006.01)

(52) U.S. Cl. ................ 463/31; 463/16; 463/17; 463/18; 463/19; 463/20; 463/25; 463/40; 463/41; 463/42; 463/43

(58) Field of Classification Search .............. 463/16–20, 463/25, 31, 3, 40–431
See application file for complete search history.

(56) References Cited

U.S. PATENT DOCUMENTS

| | | | | |
|---|---|---|---|---|
| 6,508,709 | B1 * | 1/2003 | Karmarkar | 463/42 |
| 2002/0137217 | A1 * | 9/2002 | Rowe | 436/42 |

* cited by examiner

*Primary Examiner* — Sunit Pandya
(74) *Attorney, Agent, or Firm* — Steptoe & Johnson LLP

(57) ABSTRACT

A gaming machine has at least one video screen, but preferably three. One screen displays a primary game and the other two screens preferably display pay tables, a secondary game, or artwork related to the primary and/or secondary game. The content of the video screens is reconfigurable. The content may be downloaded over a network connecting a plurality of gaming machines to a central computer or the content of several different games may be stored locally within the gaming machine.

48 Claims, 3 Drawing Sheets

RECONFIGURABLE GAMING MACHINE

RELATED APPLICATION

This patent application is a continuation of pending U.S. patent application Ser. No. 09/967,283, filed on Sep. 28, 2001 now U.S. Pat. No. 7,338,372 entitled "RECONFIGURABLE GAMING MACHINE," which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This invention relates generally to gaming machines and, more particularly, to gaming machines having the ability to reconfigure entire games, pay tables and/or artwork

BACKGROUND

Gaming machines, such as slot machines and video poker machines, are becoming increasingly popular. One reason for their popularity is the variety of games, limited only by one's imagination, which may be implemented on a gaming machine. Another reason for the popularity of gaming machines is the wide range of wager values accepted by the various gaming machines. That is, players who wish to bet $0.05 are accommodated by many gaming machines, as well as, those who wish to bet $5.00.

For these reasons, casinos typically like to change the games played on their gaming machines frequently. If a game played on a particular machine becomes tiring to game players, casinos may wish to replace that game with another.

Casinos would also like the ability to change the games played on their machines during "slow" periods of relatively little game play so as to attract more players to the machines. For example, on weekdays, it may be advantageous for casinos to have many gaming machines available that have a small minimum bet. On weekends and other busy times, casinos can generate more income by increasing the minimum bet required to play the machines. However, gaming machines are very expensive to manufacture. For this reason, instead of purchasing entirely new machines, casinos frequently retrofit existing machines with new games.

Gaming machines typically have a video display or mechanical reels upon which a primary game is played. Normally, the top box has a glass panel that displays pay tables for the primary game or artwork representative of the theme of the primary game. Sometimes the top box has a video display upon which a secondary game may be played. The belly glass usually has artwork representative of the theme of the primary game.

In order to modify the gaming machine so that players may play a new game on the machine, casino's must replace the chip containing the memory of the primary game and the chip containing the memory of the secondary game, if there is one. In some gaming jurisdictions, a regulatory agent must be present when such an exchange is made.

Further any glass panels containing pay tables or artwork representative of the game must be changed. Otherwise, the theme associated with the belly glass would be inconsistent with the new game. Likewise, pay tables must change to reflect the game theme and allowable bets. Accordingly, this process is very cumbersome, labor intensive, and expensive. Gaming machine companies must maintain graphic artists and silkscreen artists, on-site, to generate new designs and the new glass. Artists silk-screen the artwork onto the glass via a very carefully controlled process, as the quality of the silk-screen process must be very high. This is because the displays are backlit to allow the light to shine through the glass. Any pinholes or other defects become immediately apparent to the gaming machine player. In addition, the company must devote service personnel to install the fresh glass. Furthermore, during this process, the game is out of commission and, therefore, unable to generate income for the casino. What's more, this process must be done on each machine individually. Thus, changing out games is done less frequently than a slot floor manager might like.

Networked gaming devices are known in the art. Interconnecting a plurality of gaming devices, such as slot machines, via a computer network to a central computer provides many advantages. Such advantages include compiling and auditing data related to the amount of coins received by the gaming devices, the amount paid to players of the devices, and tracking player information. Furthermore, memories located within peripherals contained within the gaming machine may be reprogrammed in order to update the peripherals so that they may detect newly discovered counterfeiting or other cheating schemes. However, there are no gaming machines that may be reconfigured over a network so that entire games, associated paytables and/or artwork may be modified. Furthermore, it is not possible for a casino or player to reconfigure a gaming machine to accommodate for player status or machine location within the casino.

Accordingly, those skilled in the art have long recognized the need for gaming machines wherein games, pay tables and/or artwork may be reconfigured so that casinos may quickly and efficiently change the games played on their machines as frequently as desired without having to perform the tedious and labor intensive task of changing memory chips and display glass, and all without having to make the machines unavailable for play for long periods of time, so that the casino or its patrons may choose, from a selection of games, as to which game is played on a particular machine. The present invention also fulfills the long recognized need to reconfigure a gaming device to provide new games, pay tables, and/or artwork in response to a player's particular needs or decisions, player status, and/or the casino's gaming player's criteria.

SUMMARY

Briefly, and in general terms, the disclosed embodiments provides a gaming machine wherein games, pay tables and artwork may be reconfigured so that casinos may change the games played on their machines frequently without having to perform the tedious and labor intensive task of changing memory chips and display glass, without having to make the machines unavailable for play for long periods of time, and so that casinos and/or players may choose from a selection of games which game is played on a particular machine.

In one embodiment, a reconfigurable gaming machine includes a reconfigurable middle display panel, a reconfigurable top glass panel, and a reconfigurable belly glass panel. The reconfigurable middle display panel, the reconfigurable top glass panel, and the reconfigurable belly glass panel comprise a first video screen, a second video screen, and a third video screen, respectively. The first video screen displays a first game located on the gaming machine. The second video screen displays pay tables associated with the first game located on the gaming machine. The third video screen displays artwork associated with the theme of the first game located on the gaming machine. Additionally, the gaming machine is reconfigurable to display a second game on the three video screens in response to receiving a reconfiguration command and downloading the second game from a server via a network so that the second game is displayed on the reconfigured first video screen, pay tables associated with the second game are displayed on the reconfigured second video screen, and artwork associated with the theme of the second game is displayed on the reconfigured third video screen.

In another embodiment, a reconfigurable gaming machine includes a plurality of reconfigurable display panels. Specifically, the gaming machine includes a first reconfigurable video screen, a second reconfigurable video screen, a third reconfigurable video screen, wherein the first video screen, the second video screen, and the third video screen display the first game, information relating to the first game, and artwork related to the first game. Additionally, the gaming machine is reconfigurable to display a second game on the three video screens in response to receiving a reconfiguration command and downloading the second game from a server via a network so that the reconfigured first video screen, the reconfigured second video screen, and the reconfigured third video screen display the second game, information relating to the second game, and artwork related to the second game.

In still another embodiment, a gaming system includes a network for displaying reconfigurable video content relating to a plurality of games, as well as a server and one or more reconfigurable gaming machines. The server stores a plurality games, information relating to the games, and artwork related to the games, wherein the games, the information relating to the games, and the artwork related to the games are accessible via the network. Additionally, the one or more reconfigurable gaming machines are as described above.

In yet another embodiment, a method of displaying video content on a gaming machine is disclosed. The video content includes a first game and a second game, information associated with the first game and the second game, and artwork associated with the first game and the second game. Specifically, the method includes: displaying video content on a first reconfigurable video screen of the gaming machine; displaying video content on a second reconfigurable video screen of the gaming machine; displaying video content on a third reconfigurable video screen of the gaming machine, wherein the video content displayed on first reconfigurable video screen, the second reconfigurable video screen, and the third reconfigurable video screen includes the first game, information relating to the first game, and artwork related to the first game; in response to receiving a reconfiguration command, downloading a second game from a server via a network; and reconfiguring the video content on the three video screens for the second game, wherein the reconfigured first video screen, the reconfigured second video screen, and the reconfigured third video screen display the second game, information relating to the second game, and artwork related to the second game.

DETAILED DESCRIPTION

Figure 1:
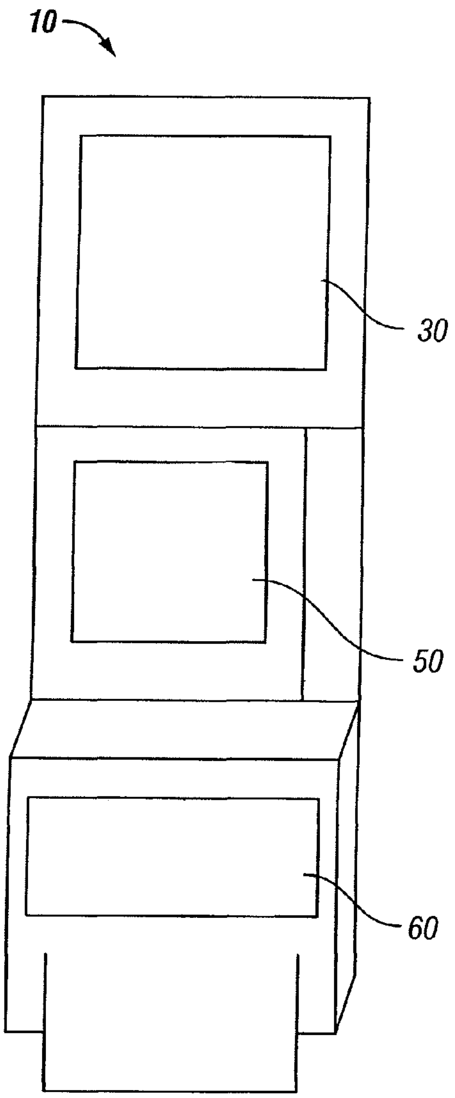
FIG. 1 is a front view of a gaming machine, in accordance with the present invention.

Referring now to the drawings, wherein like reference numerals denote like or corresponding parts throughout the drawing figures and more particularly to FIG. 1, a gaming machine 10, in accordance with a preferred embodiment, is illustrated. The gaming machine has a top display area 30, middle display area 50, and bottom display area 60. A button deck for user input is arranged below the central screen 50. The top display area 30 is typically intended to appear in size and presentation as the "top award glass" traditionally used in slot machines to present the pay table. Preferably, the top display area 30 may also be used to display a bonus game.

The middle display area 50 provides the traditional game display. Typically, spinning reels, poker, keno or any number of games are presented in the middle display area 50. The bottom display area 60 fills the area traditionally associated with the "belly glass" in a gaming machine and showcases artwork representative of the theme of the game being played in the middle screen 50. The bottom display area generally is comprised of two video displays arranged in a unique way so that the two screens have the look and feel of a single piece of glass, thus appearing to be a single, large odd-shaped display. Preferably, two 10.5 inch flat panel LCD's are placed next to one another. The area where the two displays meet is as small as possible. A single piece of glass is placed over both displays to give it the outward appearance of a single solid piece of glass. One important enabling point is the use of a PC architecture within the game and the use of the Microsoft NT or XP operating system. Since standard PC technology is preferably used, a PCI plug-in card for the PC may support four monitors simultaneously. Added to the Accelerated Graphics Port "AGP" card, which the game platform preferably runs, the game platform provides the option of using five monitors. The Microsoft operating system recognizes the multiple monitors and enables them to be driven with differing graphics. Two video outputs drive the "belly glass" LCD displays, the middle display uses the AGP output and a single video output drives a 18" LCD in the top glass area. This leaves one extra video display that may be used for any purpose.

Thus, the gaming machine retains the basic look and feel of the traditional gaming machine. There is a top glass 30 area for displaying pay table information, bonus play information, or player attraction content. There is a central main screen area 50 for active game play. Finally, there is a lower attract mode area for display 60 for the traditional belly glass, game features or advertising information. Note that all displays may include touchscreen input from the user. It should be appreciated by one skilled in the art that any number of screens may be used, in accordance with the present invention. Moreover, any content may be displayed on any of the screens.

By replacing the traditional top glass and belly glass with video displays, the need for changing top and belly glass each time a game is changed is eliminated, thus saving time and money. Furthermore, as casino patrons interact with all three screens in the preferred embodiment, a new type of game is possible that employs all three viewing areas as part of the game play. Additionally, one or more of the screens may be used to offer casino specific features to the patron. Examples include booking hotel rooms, making restaurant reservations or ordering refreshments. Alternatively, additional game play opportunities or casino-wide bonus games may be presented on one of the screens.

Figure 2:
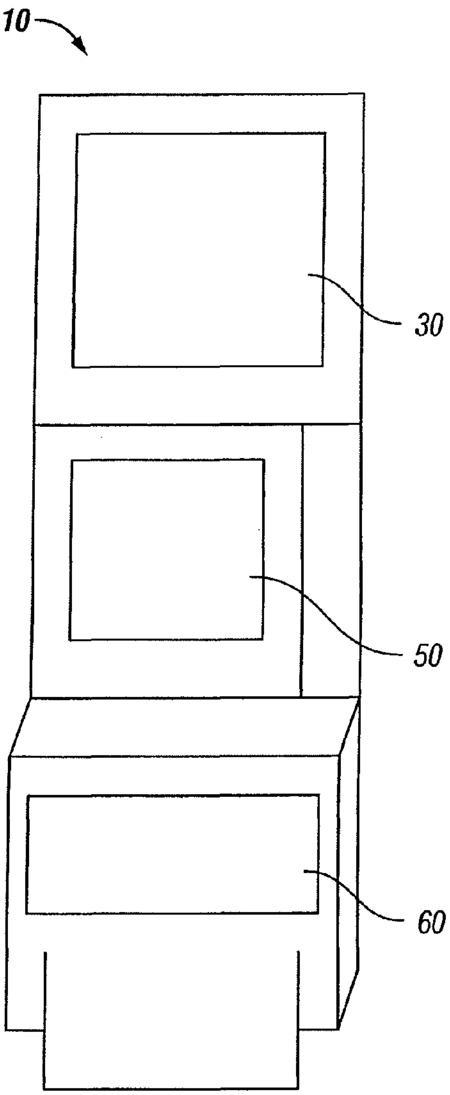
FIG. 2 is a front view of the gaming machine of FIG. 1, wherein the video displays of the gaming machine have been reconfigured, in accordance with the present invention.

FIG. 2 shows the gaming machine as illustrated in FIG. 1, but after the machine 10 has been reconfigured. In FIG. 1 the middle display area 50 shows, by way of example only, a Blazing 7's main game, the top display area 30 shows the pay tables associated with the Blazing 7's game, and the bottom display area 60 shows the artwork associated with the Blazing 7's game. In FIG. 2, the gaming machine 10 has been reconfigured so that the middle display area 50 shows a Black and White game, the top display area 30 shows the pay tables associated with Black and White game, and the bottom display area 60 shows artwork associated with the Black and White game.

In an alternate embodiment, a set of mechanical reels is used instead of the middle display area 50. Nevertheless, the pay tables displayed in the top display area 30 and the artwork associated with bottom display 60 may be reconfigured. This is particularly effective if the mechanical reels employ generic symbols.

In accordance with the present invention, the changing of a game can be accomplished by downloading the new game and related software, including associated artwork, pay tables, graphics, sound, and the like, from either a CD-ROM, an intranet, the Internet, any attached network, or any other local storage medium contained within the game. As a result, this download changes the appearance and operation of the gaming machine. In other words, complete game themes can be downloaded to the gaming machine including, but not limited to game code, pay table graphics, and attractive graphics. Alternatively, multiple games may be stored on the local storage media of the gaming machine whereby one may be selected for use on the machine. However, it should be appreciated by one skilled in the art that games may be changed using any method known in the art. In addition, the potential game choices may actually be intermittently displayed on the screens 30, 50, and 60 to attract players.

Thus, casino management can optimize play on the casino floor by rapidly reconfiguring games quickly and inexpensively. A casino can configure machines or the network to change games, paytables, minimum or maximum bets, and the like, at predetermined times, upon the occurrence of certain events, and/or the casino management can do so spontaneously. A plurality of machines may be reconfigured substantially simultaneously or the casino may choose to reconfigure only a single machine. For example, a casino may want to replace the games, associated pay tables and artwork on a plurality of machines with a more popular game, associated pay tables and artwork. Further, the casino may also program a plurality of machines to raise and lower the minimum bet required. For example, the minimum bet on machines may be $0.05 on weekdays and $5 on weekends. Or, if a busload of senior citizens, for example, unexpectedly enters the casino, the slot floor manager could quickly reconfigure some gaming machines, lowering the minimum bet to $0.05. Alternatively, a predetermined triggering event or trigger may cause the gaming machine, or certain sub-groupings of them, to reconfigure. For example, the gaming machine may lower or raise odds depending on the identity of the player (the network knows the identity of the player if the player inserts his or her game or club card into a card reader, as is known in the art) or the speed at which the game is being played, or the amount waged. Alternatively, a game change could take place at the request of a patron by the selection of a game title from a multi-game menu. This allows the player to sit at a machine in a specific location within the casino and to also play his game of choice.

Now, turning to the details of operation, the invention preferably utilizes a client-server software architecture such that the client portion of the game can be separated from the server portion. In a stand-alone embodiment, both the client process and the server process will run within a gaming machine, but as two different processes. The stand-alone game is entirely contained within the gaming machine with all mechanical, electronic and algorithmic security, and authentication built in. This game can, essentially, be powered up and subsequently operate independently of any other system or network.

Figure 3:
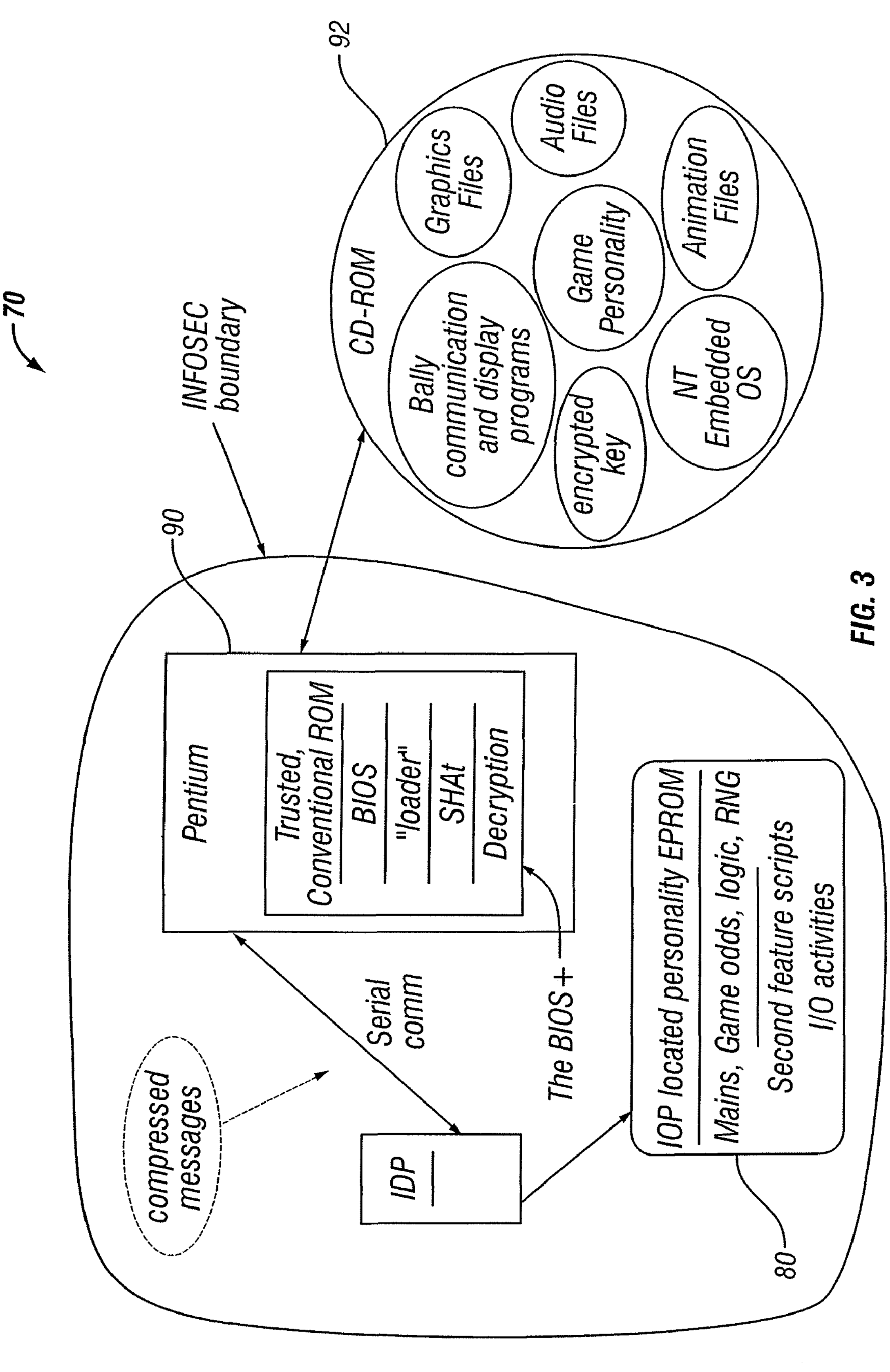
FIG. 3 is an illustration of a gaming platform that is used in a preferred embodiment of the present invention.
Figure 4:
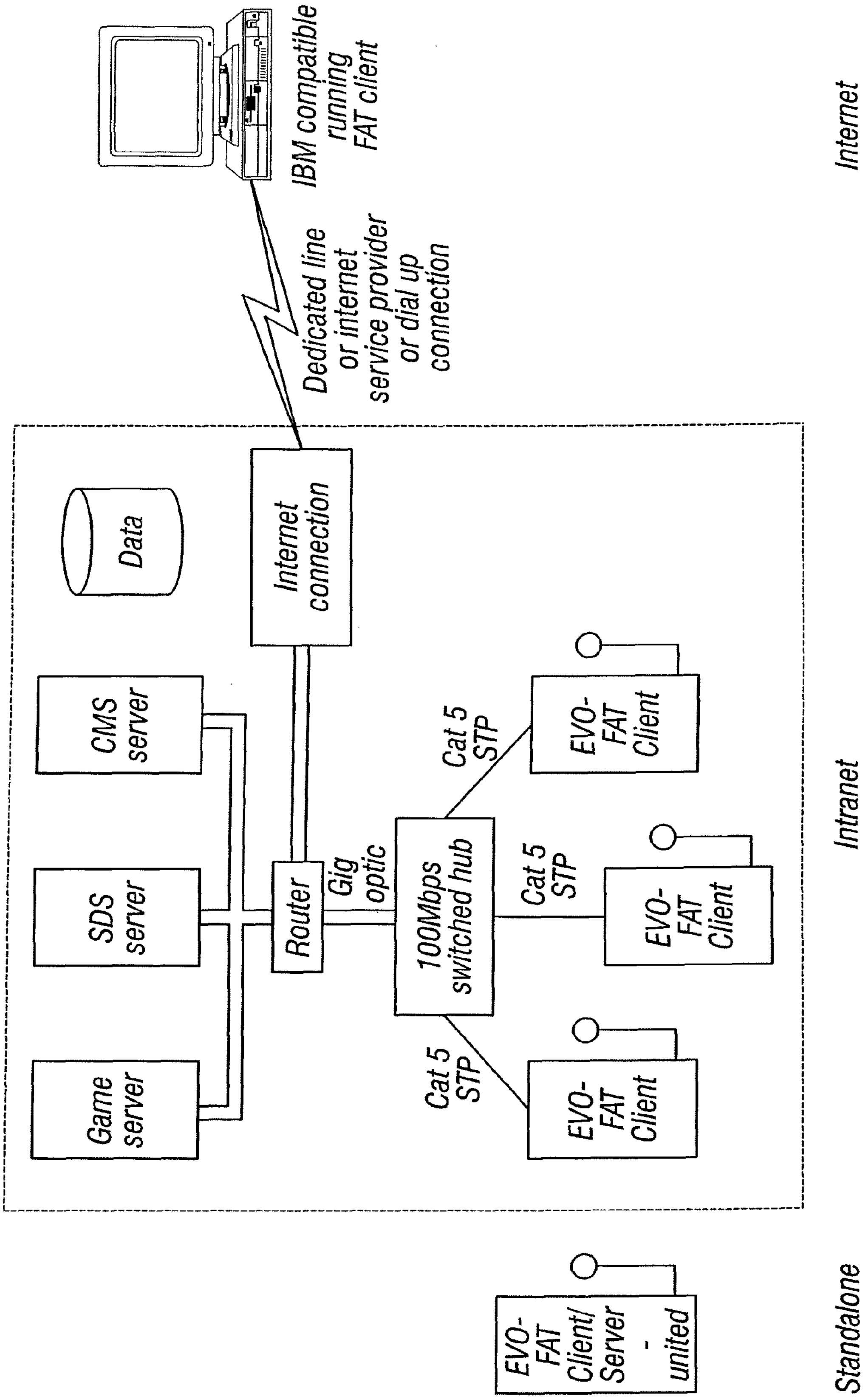
FIG. 4 is an illustration of various network configurations used in other preferred embodiments of the present invention.

Referring now to FIG. 3, a preferred stand-alone display and input system of the present invention uses a gaming platform 70 as its foundation and an "EPROM" and CD-ROM paired" design. The gaming platform 70 itself, is a highly advantageous system, that enables casino owners to draw off of the large library of casino game functions available in a traditional master processing unit (MPU) stand-alone platform, while adding the graphics and sound capabilities of a personal computer.

The game platform 70 uses two separate processors connected by a serial line. The first processor, referred to as the Input/Output processor 80 (IOP), contains no video or sound hardware. The IOP 80 contains all of the game logic, random number generators (RNG), host Input/Output (I/O), device I/O, and the core mains and personality EPROMs. The mains are the majority of code that runs the physical components of the gaming machine and the associated peripherals. The personality includes the odds, probabilities, winning symbols, and game rules. The functions contained on the EPROM are verifiable by traditional integrated circuit ("IC") testing techniques.

The second processor is a Pentium class PC-based processor 90 that has a CD-ROM read-only drive. The graphics, sound files, presentation software for at least one game, and basic operating system are stored on the CD-ROM. The Pentium processor 90 also has a customized BIOS chip, referred to as a BIOS+, which provides typical PC boot functions, as well as verification and decryption algorithms. The BIOS+ on the Pentium motherboard verifies the CD-ROM before the contents of the CD-ROM can be loaded into the Pentium RAM. In other preferred embodiments of the present invention, non-Pentium (but substantially equivalent functionality) processors are utilized including, by way of example only, and not by way of limitation, other non-Pentium Intel processors, Advanced Micro Devices (AMD) processors, and Motorola processors.

The IOP 80 is derived from a traditional MPU stand-alone platform, and provides access to the above-described library of casino game functions and drivers for casino games. However, the PC industry has a large number of tools that can create graphics and sound very efficiently. For this reason, the gaming platform 70 also includes a diskless, Pentium class processor 90 running an operating system that accepts PC sound and graphics content. The gaming platform 70 combines the strengths of a traditional stand-alone MPU game engine with the audio and visual capabilities that are available in the PC industry. Thus, the gaming platform 70 enables PC content to be used directly on a game platform vis-à-vis a Windows operating system environment (or other suitable graphic user interface (GUI)).

The IOP 80 in the gaming platform 70 differs from the traditional stand-alone MPU architecture in several ways. For example, in the gaming platform 70 the contents of the graphics chips are not located in the IOP 80 (as they are in the MPU), but rather are replaced by enhanced graphics, animations and sound files stored on the CD-ROM. The Pentium class processor 90 has presentation software for displaying the graphics and sound upon request from the game logic process within the IOP 80.

The intranet and stand-alone game cabinets include a hardware distinction. They employ the concept of "gadgets," i.e., generic device control units and specific device control units. These gadgets handle the "hard real time" processing tasks, freeing the Win32 (Microsoft) operating system to focus on user interface, graphics and sound tasks. A complete discussion of gadgets can be found in U.S. patent application Ser. No. 09/746,854, filed on Dec. 22, 2000 and incorporated herein by reference.

Referring now to security requirements, a primary objective of the security design is to satisfy all security requirements and gaming jurisdiction directives. Due to gaming compliance requirements, game code must be secure and authenticated. That is, a gaming device must be certain that the software that it is operating has been approved by the jurisdiction in which the game resides. The relevant directives require that the verification information and the verification code reside on a "conventional ROM device." However, pursuant to the proposed amendments to Gaming Regulations, a "conventional ROM device" may include FLASH memory components provided that they cannot be altered while installed in a gaming device. To satisfy these directives, the verification algorithm of the gaming platform 70 resides on a conventional ROM device, secured within the Pentium/IOP assembly. Security also includes physical cabinetry, locks and procedures.

The security architecture shown in FIG. 3 logically divides the gaming platform 70 security into critical components located inside or outside of an information security (INFOSEC) boundary. Within the secure portion of the INFOSEC Boundary, the gaming platform 70 includes the IOP 80 and the Pentium class processor 90, connected by a serial line. Preferably, the IOP 80 portion of the design is based on a Motorola 68332 and EPROMs. Preferably, on the Pentium 90 portion, the BIOS+ chip plugs into the Pentium motherboard and is physically secured within the Pentium assembly chassis. The conventional ROM device is socketed into the Pentium motherboard 90 and can be covered with a tamper-evident material. The CD-ROM assembly is logically outside of the INFOSEC boundary. The CD-ROM assembly contains a commercial off-the-shelf CD read-only reader and the game CD-ROM.

The gaming platform 70 performs many verification processes during boot-up and game operation. Each game personality EPROM image on the IOP 80 is compared with those on the accompanying CD-ROM. The IOP board 80 initiates re-verification of the CD-ROM and informs the Pentium class processor 90 of any tilts that occur. Moreover, on the EPROM-controlled IOP 80, memory is continuously tested in order to immediately catch any changes. Further, an algorithm that originates on the BIOS+ conducts verification of all files on the CD-ROM.

The IOP 80 preferably uses VRTX as its operating system. VRTX is a reliable, real-time operating system with multitasking capabilities and has been used in the gaming environment for many years. The preferred operating system for the Pentium class motherboard is a multi-tasking operating system capable of running off non-writable media such as CD-ROM or EPROM in order to satisfy gaming jurisdictional requirements. Microsoft NT Embedded, XP Embedded, and LINUX are examples of such an operating system. The Pentium class motherboard 90 preferably uses Microsoft's Windows NT embedded. However, other operating systems could also be selected in other embodiments of the present invention, depending on many factors, including the desired graphic user interface (GUI).

NT embedded is particularly effective since many tools and developers are available for producing creative content on Windows-style platforms. Windows NT embedded differs from standard desktop operating systems, such as Windows 98 and Windows NT, which require a hard drive. These operating systems make use of a swap file to move programs and data between RAM and a hard disk. However, NT embedded eliminates the need for a swap file. NT embedded is customizable in this regard, allowing the swap file size to be set to zero so that no writable mass storage device is required. Further, NT embedded is preferably customized and compiled with only those components required to run a particular game or games. In other words, there are no additional drivers or services provided. Typically, there is no TCP/IP stack (or networking capabilities whatsoever). Preferably, this version of NT embedded is completely stand-alone and provides none of the traditional accessing "handles."

One preferred example of the media flow proceeds in the following sequence. (1) Verify the boot chip using traditional IC verification techniques. (2) The power comes up. The BIOS+ runs a self-verification on its own code. (3) The Pentium class processor 90 begins executing the BIOS+. (4) The BIOS+ comes up far enough to read the CD-ROM. Verification is run on the entire CD-ROM contents using a SHA-1 algorithm contained within the BIOS+. (5) A private key encrypted SHA-1 value, located in a secure location on the CD-ROM, is decrypted with the public key and algorithm contained on the BIOS+. (6) The results of the SHA-1, and now decrypted SHA-1 value, are compared. A match allows the operating system, program files, graphics, and audio to be loaded into the Pentium's RAM from the CD-ROM. (7) Since the IOP 80 can boot faster from the EPROM, the IOP waits to hear that the Pentium class processor has booted and loaded all needed software components into RAM. (8) The IOP 80 then checks the Pentium software levels using the same scheme used to match game driver levels to personality chip requirements. If the versions are acceptable, the IOP 80 confirms that the game personality contained in the EPROM matches the game personality on the CD-ROM. (9) The game programs are loaded into IOP RAM and the game then proceeds, driven by the IOP RAM.

Thus, the game personality contained in EPROM on the IOP 80, and the game personality on the CD-ROM, are a matched set. If the two do not match, a fatal tilt results, rendering the game inoperable. This also means that the regulators must approve both the EPROM and the CD-ROM for every game released for distribution and approval. This process verifies the conventional ROM device and detects any substitution of the BIOS+. Both the SHA and DSA algorithms and key are held in a device that can be physically verified by the gaming control agents. For example, the EPROM or a FLASH chip may contain these pieces of information. Thus, the method builds layers of trust beginning with the physical flash chip. Once that chip has been verified, the field agent can trust the results of that chip testing other data. For example, it may go on to test the CD-ROM or EPROM's containing the game code.

In another preferred embodiment, the gaming platform 70 utilizes a "CD-ROM controlled" design. In this configuration, the game personality EPROM contents are placed on the CD-ROM only and not on the IOP. Once the Pentium class processor 90 boots and successfully verifies the contents of the CD-ROM, a binary image of the game personality (which is located on the EPROM of the IOP 80 in the "paired" design EVO platform 70) is downloaded from the CD-ROM to a RAM chip located in the IOP 80. This RAM chip occupies the same socket as the game personality EPROM in the IOP 80 in the "paired" design gaming platform 70. Existing game driver level checks between the IOP 80 mains and the game personalities remain in place and are equally effective in this RAM-based personality design.

The "CD-ROM controlled" design provides the advantage of reducing the testing and distribution workload for gaming regulators because only a CD-ROM needs to be tested and released for new game content. Further, the "CD-ROM controlled" design also eases the need for compatibility checks between the IOP 80 and the Pentium class processor 90.

The intranet embodiments of the invention are important since they allow the casino operators to rapidly change the mix of the games on their floors with a minimum of time and effort. The intranet product also uses a client server software architecture. In some embodiments, the server is located within the gaming cabinet. In other embodiments, the server is located in the casino computer room or another secure location that may be remote to the casino. A server may handle multiple clients or a single client.

In a first intranet embodiment, the entire game is downloaded at a given time to the gaming cabinet. That is, the client and server process can be downloaded to the game and then, reside in the gaming machine, just as in the stand-alone case. Thus, for example, on Monday night at 2 a.m. the casino can download new games to some or all of the machines.

The server provides game outcomes to the client. In addition, the rules, accounting, random number generation and operation of the game are controlled by the server. Each game has its own random number generator within the server. Indeed, entirely different types of games, all being played simultaneously may share a single server. For example, there may be slot games, poker, roulette, and the like, all being played at once and sharing the same server. Each of these games will have an independent random number generator and its outcomes will have no relation to the other games currently underway even though the games all use the same server. In a preferred intranet embodiment, Microsoft Win2000 Server is the operating system used by the server.

Preferably, the client is "fat" meaning that it has all the graphics, sound, and some player response capabilities in order to keep the amount of messaging traffic on the network to a minimum. With 3000 machines in a typical casino, if the server has to send graphics and sound information for each play on every game, the network will become overwhelmed. Therefore, preferably, only a minimum amount of information is transferred between the client and the server. The messages between the client and the server are optimized for small size and minimal impact on the overall network bandwidth. If all the games on the floor need to communicate with the server, the data packets need to be small so that the traffic may be handled without delay.

The server and the client are preferably connected over a high-speed communication media. Examples are 10/100 BaseT Ethernet run over Cat 5 cable for the physical connection. Further, "long line" Ethernet can be run over older Cat 3 cable. The network might include RF portions that allow wireless connection from the slot floor ceiling to a slot carousel on the floor. Preferably, TCP/IP with HTTP and XML messaging handles the protocol.

In a preferred Internet embodiment, the server is located within a casino's backroom or elsewhere, as described for the intranet case, but the client will likely employ a browser such as Internet Explorer or Netscape Navigator. In addition, graphics, sound, and an executable file or applet will reside within the browser using Java 1.3 and Macromedia Shockwave to provide streaming content delivery. Only user display functionality will be at the user PC. All game outcome information will reside in the server. In this way, new game content and data may be quickly downloaded to the gaming module quickly and securely.

In accordance with the present invention, games can be produced that seamlessly move from the stand-alone to the intranet to the Internet game platforms. In other words, the graphics and "play" of a game can be the same whether the player is using a stand-alone, intranet or Internet game platform. This improves the players experience since they will experience the same game play under all circumstances. This also improves the casino's operational efficiency since the server component can be common between the intranet and Internet products.

It should be noted that the content delivery mechanism, which is, the content creation engine, and tools may be but are not required to be, the same for the intranet, Internet and stand-alone versions as described herein. Not only are they typically the same, but they may use Microsoft Windows standard tools, methods and techniques. Since these are clearly dominant in the marketplace, game manufactures can take advantage of a large pool of people and tools to create new game content. This extends to other areas of administrative efficiency. For example, gaming regulators can be mailed .bmp, .jpg and .avi files for approval of games. Further, since these are the actual files used in the games themselves, gaming regulators can approve the games more quickly as their desktop computers can readily read these files.

Today, there are many thousands of individual games, each separately communicating to the accounting server. Centralizing these into a single or a few game servers will have positive implications, such as improved reliability and data accuracy. In the intranet and Internet cases, where the games reside on a central server, there is only one central location that holds all the meters and accounting information. Thus, the "game server" can talk to the "accounting server" passing between these two systems all of the information required.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A gaming machine comprising:

a reconfigurable first video screen displaying a first game located on the gaming machine;

a reconfigurable second video screen displaying pay tables associated with the first game located on the gaming machine; and a reconfigurable third video screen displaying artwork associated with the theme of the first game located on the gaming machine;

wherein the gaming machine is reconfigurable to display a second game on the three video screens in response to receiving a reconfiguration command and downloading the second game from a server via a network so that the second game is displayed on the reconfigured first video screen, pay tables associated with the second game are displayed on the reconfigured second video screen, and artwork associated with the theme of the second game is displayed on the reconfigured third video screen.

2. The gaming machine of claim 1, wherein the reconfiguration command is activated by a trigger.

3. The gaming machine of claim 2, wherein the trigger is a wagered amount.

4. The gaming machine of claim 2, wherein the trigger is an identity of a player.

5. The gaming machine of claim 2, wherein the trigger is a speed at which a game is played.

6. The gaming machine of claim 1, wherein the reconfiguration command is casino personnel-activated.

7. The gaming machine of claim 1, wherein the reconfiguration command is player-activated.

8. The gaming machine of claim 1, wherein the second game is authenticated after being downloaded.

9. The gaming machine of claim 1, wherein one or more of the screens is used to offer casino specific features a player.

10. The gaming machine of claim 1, wherein the casino specific features include booking hotel rooms, making restaurant reservations, ordering refreshments, or combinations thereof.

11. The gaming machine of claim 1, wherein additional game play opportunities are presented on one of the screens.

12. The gaming machine of claim 1, wherein casino-wide bonus games are presented on one of the screens.

13. A gaming machine having a plurality of reconfigurable video screens, the gaming machine comprising:

a first reconfigurable video screen located on the gaming machine;

a second reconfigurable video screen located on the gaming machine; and a third reconfigurable video screen located on the gaming machine;

wherein the first video screen, the second video screen, and the third video screen display the first game, information relating to the first game, and artwork related to the first game;

wherein the gaming machine is reconfigurable to display a second game on the three video screens in response to receiving a reconfiguration command and downloading the second game from a server via a network so that the reconfigured first video screen, the reconfigured second video screen, and the reconfigured third video screen display the second game, information relating to the second game, and artwork related to the second game.

14. The gaming machine of claim 13, wherein the reconfiguration command is activated by a trigger.

15. The gaming machine of claim 14, wherein the trigger is a wagered amount.

16. The gaming machine of claim 14, wherein the trigger is an identity of a player.

17. The gaming machine of claim 14, wherein the trigger is a speed at which a game is played.

18. The gaming machine of claim 13, wherein the reconfiguration command is casino personnel-activated.

19. The gaming machine of claim 13, wherein the reconfiguration command is player-activated.

20. The gaming machine of claim 13, wherein the second game is authenticated after being downloaded.

21. The gaming machine of claim 13, wherein one or more of the screens is used to offer casino specific features a player.

22. The gaming machine of claim 13, wherein the casino specific features include booking hotel rooms, making restaurant reservations, ordering refreshments, or combinations thereof.

23. The gaming machine of claim 13, wherein additional game play opportunities are presented on one of the screens.

24. The gaming machine of claim 13, wherein casino-wide bonus games are presented on one of the screens.

25. A gaming system having a network for displaying reconfigurable video content relating to a plurality of games, the gaming system comprising:

a server storing a plurality games, information relating to the games, and artwork related to the games, wherein the games, the information relating to the games, and the artwork related to the games are accessible via the network; and one or more gaming machine having a plurality of reconfigurable video screens, each gaming machine further comprising:

a first reconfigurable video screen located on the gaming machine;

a second reconfigurable video screen located on the gaming machine; and a third reconfigurable video screen located on the gaming machine;

wherein the first video screen, the second video screen, and the third video screen display the first game, information relating to the first game, and artwork related to the first game;

wherein the gaming machine is reconfigurable to display a second game on the three video screens in response to receiving a reconfiguration command and downloading the second game from the server via the network so that the reconfigured first video screen, the reconfigured second video screen, and the reconfigured third video screen display the second game, information relating to the second game, and artwork related to the second game.

26. The gaming system of claim 25, wherein the reconfiguration command is activated by a trigger.

27. The gaming system of claim 26, wherein the trigger is a wagered amount.

28. The gaming system of claim 26, wherein the trigger is an identity of a player.

29. The gaming system of claim 26, wherein the trigger is a speed at which a game is played.

30. The gaming system of claim 25, wherein the reconfiguration command is casino personnel-activated.

31. The gaming system of claim 25, wherein the reconfiguration command is player-activated.

32. The gaming system of claim 25, wherein the second game is authenticated after being downloaded.

33. The gaming system of claim 25, wherein one or more of the screens is used to offer casino specific features a player.

34. The gaming system of claim 25, wherein the casino specific features include booking hotel rooms, making restaurant reservations, ordering refreshments, or combinations thereof.

35. The gaming system of claim 25, wherein additional game play opportunities are presented on one of the screens.

36. The gaming system of claim 25, wherein casino-wide bonus games are presented on one of the screens.

37. A method of displaying video content on a gaming machine, the video content including a first game and a second game, information associated with the first game and the second game, and artwork associated with the first game and the second game, the method comprising:

displaying video content on a first reconfigurable video screen of the gaming machine;

displaying video content on a second reconfigurable video screen of the gaming machine;

displaying video content on a third reconfigurable video screen of the gaming machine, wherein the video content displayed on first reconfigurable video screen, the second reconfigurable video screen, and the third reconfigurable video screen includes the first game, information relating to the first game, and artwork related to the first game;

in response to receiving a reconfiguration command, downloading a second game from a server via a network; and reconfiguring the video content on the three video screens for the second game, wherein the reconfigured first video screen, the reconfigured second video screen, and the reconfigured third video screen display the second game, information relating to the second game, and artwork related to the second game.

38. The method of claim 37, wherein the reconfiguration command is activated by a trigger.

39. The method of claim 38, wherein the trigger is a wagered amount.

40. The method of claim 38, wherein the trigger is an identity of a player.

41. The method of claim 38, wherein the trigger is a speed at which a game is played.

42. The method of claim 37, wherein the reconfiguration command is casino personnel-activated.

43. The method of claim 37, wherein the reconfiguration command is player-activated.

44. The method of claim 37, wherein the second game is authenticated after being downloaded.

45. The method of claim 37, wherein one or more of the screens is used to offer casino specific features a player.

46. The method of claim 37, wherein the casino specific features include booking hotel rooms, making restaurant reservations, ordering refreshments, or combinations thereof.

47. The method of claim 37, wherein additional game play opportunities are presented on one of the screens.

48. The method of claim 37, wherein casino-wide bonus games are presented on one of the screens.

* * * * *

UNITED STATES PATENT AND TRADEMARK OFFICE

CERTIFICATE OF CORRECTION

PATENT NO. : 8,066,566 B2
APPLICATION NO. : 12/029405
DATED : November 29, 2011
INVENTOR(S) : James W. Morrow et al.

It is certified that error appears in the above-identified patent and that said Letters Patent is hereby corrected as shown below:

Column 7
In line 38, replace “Boundary” with --boundary--

Column 12
In line 61, after “features” insert --to--

Signed and Sealed this
Fourteenth Day of February, 2012

David J. Kappos

*Director of the United States Patent and Trademark Office*